Jan. 27, 1925.
F. L. KOHLHASE
ELECTRICAL TOASTER
Filed March 19, 1923
1,524,479
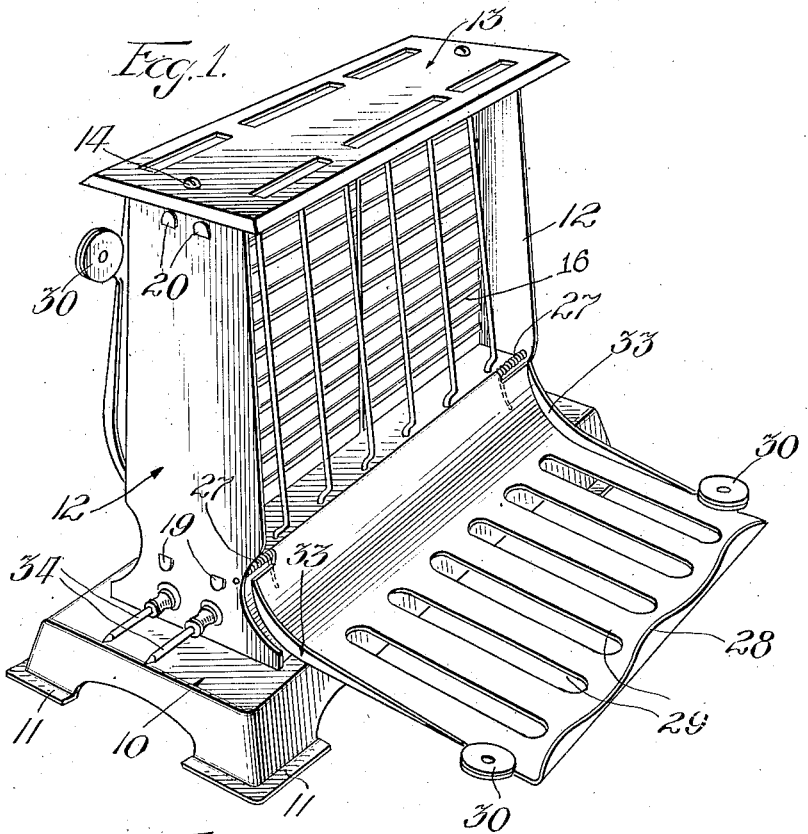
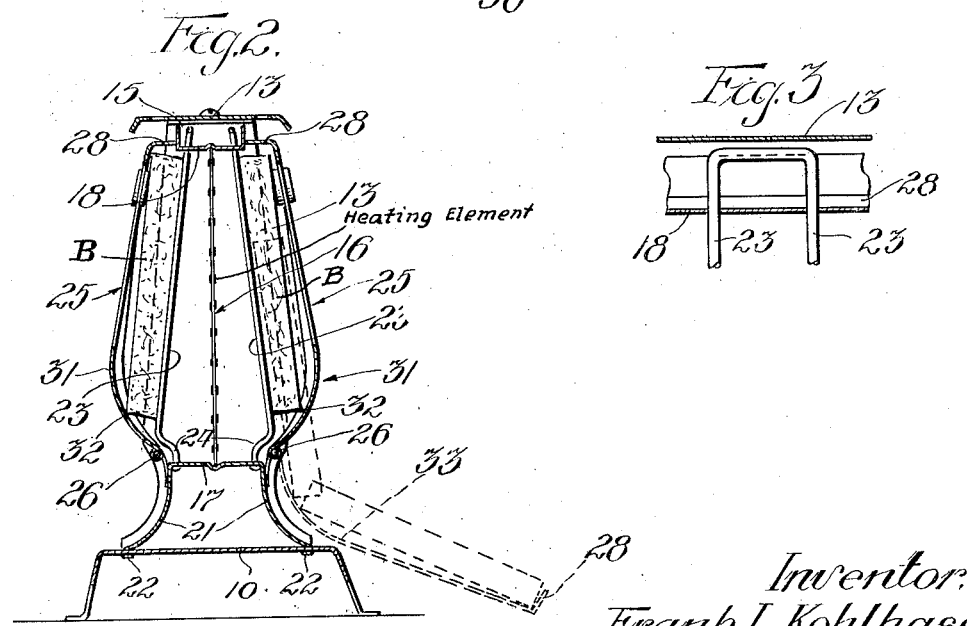
Inventor:
Frank L. Kohlhase
by William W. Hall
Atty.

Patented Jan. 27, 1925.

1,524,479

UNITED STATES PATENT OFFICE.

FRANK L. KOHLHASE, OF CHICAGO, ILLINOIS.

ELECTRICAL TOASTER.

Application filed March 19, 1923. Serial No. 626,003.

*To all whom it may concern:*

Be it known that I, FRANK L. KOHLHASE, a citizen of the United States, and a resident of Chicago, in the county of Cook and State of Illinois, have invented certain new and useful Improvements in Electrical Toasters; and I do hereby declare that the following is a full, clear, and exact description thereof, reference being had to the accompanying drawings, and to the characters of reference marked thereon, which form a part of this specification.

This invention relates to electrical toasters for toasting slices of bread and like edible products and refers more particularly to improvements in that type of toaster in which a slice of bread, after one side thereof has been sufficiently toasted, can be automatically turned by merely swinging a door outwardly and downwardly so as to automatically present its untoasted side to the heating element when the door is returned to its normal or upright position.

The objects of the invention are to simplify and improve the construction and operation of electrical toasters of this type, to reduce the cost thereof and to produce an ornamental device which will be slightly on a dining table where it is commonly used.

The invention consists in the combination and arrangement of the elements shown in the drawings and described in the specification, and is pointed out in the appended claims.

Figure 1 is a perspective view of a toaster embodying my invention with the door or outer grid swung downwardly.

Figure 2 is a vertical sectional view thereof showing in dotted lines one of the doors in its lowermost position and the path through which it swings when turning the slice of bread being toasted, and showing also in full and dotted lines the positions through which the slice of bread passes while being reversed.

Figure 3 is a fragmentary detail showing the construction of the bread supporting grid wires and the manner of fixing them to the frame structure.

10 designates a sheet metal base formed to provide supporting feet 11; 12 a pair of upright end plates or standards fixedly secured to the base, and 13 an apertured top plate or cover which extends between and is fastened, as by the screws 14, to the end plates by inwardly turned flanges 15 at the upper ends of the end plates, and is made of longitudinal and lateral dimensions to extend outwardly beyond said end plates. 16 designates a heating unit of any preferred type that is disposed centrally of the toaster structure and is sustained by a lower flanged bar 17 and an upper flanged bar 18; said bars being longitudinally grooved to receive the edges of the heating unit. Said bars are attached to the end plates 12 by means of spur extensions 19, 20 thereof and which extend through openings in the end plates and are folded over the outer faces of said end plates. The flanges 21 of the lower flanged plate 17 are vertically elongated and outwardly curved and are fastened to the base by the spurs 22, shown in Figure 2.

23, 23 designate inner grid wires arranged symmetrically with resepect to each other and the heating unit and at the sides of said heating unit. They are inclined so as to form upwardly and inwardly extending supports for the bread slices B. Preferably, and as more clearly shown in Figures 2 and 3, each two adjacent grid wires are made of a single piece of wire, bent in U-shape, with the closed portion thereof above the upper unit supporting plate 18, and with the lower ends 24 thereof offset inwardly and extending through and riveted under the heating unit support plate 17. There are two series of such grid wires which provide for a double toaster to simultaneously toast two slices of bread thus supported at the opposite sides of the heating unit.

25, 25 designate two swinging doors arranged one at each side of the structure. Said doors are hinged on pintle rods 26 which are mounted at their ends in the end plates near the lower ends of the grid wires 23. Spiral restoring springs 27 serve to normally hold the doors in their upper positions with the inturned flanges 28 thereof bearing against the flanges of the upper heating unit supporting plate, as shown in Figure 2. Said doors are shown as made of sheet metal having numerous slots 29 to permit the passage of air therethrough and to lighten the structure. The doors constitute, in effect, outer grids between which and the inner grid wires 23, the slices of bread are confined while being toasted. The doors are provided near their upper ends and at their sides with heat insulated hand pieces 30 by which to manipulate the doors.

Said doors are formed near their lower hinged portions with wide curves, or outwardly bowed parts 31 which are spaced from the grid wires a distance greater than the parts of the doors below and above the curved parts, as best shown in Figure 2. The doors are provided at their sides with inturned flanges 33 which serve to guide the bread slices when moving outwardly over the downwardly swung doors in the manner hereinafter described.

In operation the bread slices are sustained in toasting position by engagement of their lower outer corners against horizontal line contacts with the inner faces of the doors at 32 between the widest curved portions thereof and the hinged or pintle rods 26 of said doors. The curved parts of the doors therefore serve, in connection with the weight of the bread slice, to hold said slice against the grid wires 23, and by the latter spaced a suitable distance from the heating unit.

After the inner face of a bread slice has been sufficiently toasted, its associate door is swung sharply outwardly and downwardly by grasping one of the hand pieces 30. The line support on the door, which theretofore sustained the bread slice in normal toasting position, thus falls away from the lower outer corner of the bread slice whereupon said slice loses its support and slides by gravity along the grid wires 23, as indicated in the first dotted line position shown in Figure 2, with its inner corner edge engaging the portion of the normally inner face of the door which is now below the hinge 26; and when said door reaches the position shown in full lines in Figure 1 and in dotted lines in Figure 2, the weight of the bread slice will cause the latter to slide downwardly over the then upwardly facing inner curved portion of the door so that when the slice reaches the second full dotted line position, indicated in Figure 2, its toasted side will face downwardly and its untoasted side will face upwardly. The guides 33 and flange 28 constitute means to hold the bread slice properly in place on the door during the time the slice is sliding downwardly across the door. The restoring springs 27 for the door are made of sufficient strength to lift the door and the bread slice upwardly to the normal toasting position, indicated in full lines in Figure 2, and thereby present the untoasted side of the slice against the grid wires 23 and towards the heating unit 16.

It will be observed that the curved portions of the doors, which normally support the bread slices and press them against the grid wires 23, perform the double function of holding the bread slices in place during toasting operation and reversing said slices of bread when the doors are swung outwardly and downwardly in the manner described. It will also be observed that the parts which effect these functions are integral portions of the doors and that the relatively large curvature of the active portions of the doors produces a smooth action during the changing positions of the bread slices as they are being reversed preparatory to being presented with their untoasted sides towards the heating unit. It will also be observed that the energy exerted to reverse the bread slices is that brought into work solely through gravity and that no mechanical stress is exerted on the door hinges or other parts associated therewith when the door is open for the purpose of moving the bread slice bodily forward to start it towards its reversing cycle. The parts are, therefore, capable of being made relatively lighter than other toasters of this general type and moreover, there is no tendency to break or crush the bread through the action of mechanical devices heretofore proposed to withdraw the lower edge of the bread slices from supporting ledges. The doors, therefore, become merely confining, guiding mediums by which to confine the bread slices in toasting positions and to guide them in their reversing cycles. For this reason, the construction of the toaster structure as a whole is greatly simplified in the cost of manufacture and assembly reduced.

The heating unit is provided with the usual terminals 34 for connection to an external source of electrical current.

I claim:

1. An electrical reversible toaster comprising a grid against which the bread is held in toasting position and a member swingable towards and from the grid and between which and the grid the bread is confined, said swingable member being adapted near its lower part to support the bread in toasting position and to move away from its supporting position when swung outwardly and downwardly to permit the bread to slide downwardly thereon in reversed position solely by gravity of the bread.

2. An electrical reversible toaster comprising a grid against which the bread is held in toasting position, a member swingable towards and from the grid and between which and the grid the bread is confined, said swingable member being adapted near its lower part to support the bread in toasting position and to move away from its supporting position when swung outwardly and downwardly to permit the bread to slide downwardly thereon in reversed position solely by gravity of the bread, and marginal parts on said member to guide and confine the bread when it slides down on said member.

3. An electrical reversible toaster comprising a heating unit, a spacing grid in front of said unit, and a member hinged at its lower edge to the toaster structure to swing towards and away from the grid and formed above its hinge with a supporting surface to engage the outer lower corner of a bread slice when in toasting position and below said surface with a continuing integral inwardly and downwardly curved part, for the purpose set forth.

4. An electrical reversible toaster comprising a heating unit, a spacing grid in front of said unit, and a member hinged at its lower edge to the toaster structure to swing towards and away from the grid, said member being formed above its hinged edge with a wide outer curve having on its inner face an integral bread support and below said wide curve with an inwardly and downwardly facing surface, all integral parts of said member.

5. An electrical reversible toaster comprising a heating unit, a spacing grid in front of said unit, and a member hinged at its lower edge to the toaster structure to swing towards and away from the grid, said member being formed above its hinged edge with a wide outer curve to form an integral line contact support for the outer corner edge of a bread slice to hold it in toasting position, and formed below said curved portion with an integral inwardly and downwardly inclined portion to engage the lower inner corner of a bread slice when said member is swung downwardly and outwardly to allow the bread slice to drop by gravity, and over which said slice slides when the member is in its lowermost position.

6. An electrical reversible toaster comprising a frame, a heating unit, a grid against which the bread is held in toasting position and a door hinged at its lower edge to the frame between which and the grid the bread is confined, said door having above its hinge an integral curved bread supporting and reversing part which extends entirely to the hinge, whereby the bread, in toasting position, is supported at its outer lower corner edge against the inner face of the curved part and is adapted to drop by gravity with the inner lower corner of the bread engaged with said curved part when the door is swung outwardly and downwardly.

7. An electrical toaster comprising a base, upstanding end plates, upper and lower bars extending between and supported on said end plates, a plurality of grid members extending between and supported by said bars, adjacent grid members being formed of single U-shaped wires with their closed ends at said upper bar and with their lower ends fixed to said lower bar, and a heating unit in rear of said grid members.

8. An electrical toaster comprising a base, upstanding end plates, upper and lower bars extending between and supported on said end plates, a plurality of grid members extending between and supported by said bars, adjacent grid members being formed of single U-shaped wires with their closed ends at said upper bar and with their lower ends fixed to said lower bar, and a heating unit in rear of said grid members, said grid members extending downwardly and outwardly from the upper bar and formed at their lower ends with inner offset portions for attachment to said lower bar.

In witness whereof I claim the foregoing as my invention, I hereunto append my signature this 16th day of March, 1923.

FRANK L. KOHLHASE.